United States Patent
Madhani et al.

(10) Patent No.: US 8,497,478 B2
(45) Date of Patent: *Jul. 30, 2013

(54) HIGH VOLTAGE SUPPLY TO INCREASE RISE TIME OF CURRENT THROUGH LIGHT SOURCE IN AN OPTICAL SENSOR SYSTEM

(75) Inventors: Vipin C. Madhani, Burlington, MA (US); Alan Adamsky, Newton, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 873 days.

This patent is subject to a terminal disclaimer.

(21) Appl. No.: 12/652,095

(22) Filed: Jan. 5, 2010

(65) Prior Publication Data

US 2010/0243897 A1    Sep. 30, 2010

Related U.S. Application Data

(60) Provisional application No. 61/165,171, filed on Mar. 31, 2009, provisional application No. 61/165,181, filed on Mar. 31, 2009, provisional application No. 61/165,388, filed on Mar. 31, 2009, provisional application No. 61/165,159, filed on Mar. 31, 2009.

(51) Int. Cl.
*G01J 5/02*    (2006.01)
*H05B 37/00*    (2006.01)

(52) U.S. Cl.
USPC .......................................... 250/341.8; 315/86

(58) Field of Classification Search
USPC .......................................... 250/341.8; 315/86
See application file for complete search history.

(56) References Cited

U.S. PATENT DOCUMENTS

| | | | |
|---|---|---|---|
| 4,017,847 | A | 4/1977 | Burford et al. |
| 4,743,897 | A | 5/1988 | Perez |
| 5,365,148 | A | 11/1994 | Mallon et al. |
| RE36,789 | E * | 7/2000 | Mandel et al. .................. 326/30 |
| 6,584,283 | B2 | 6/2003 | Gabello et al. |
| 7,202,641 | B2 | 4/2007 | Claessens et al. |
| 2002/0047642 | A1 | 4/2002 | Miyagawa |
| 2004/0090403 | A1 | 5/2004 | Huang |
| 2004/0251854 | A1 * | 12/2004 | Matsuda et al. .............. 315/291 |
| 2005/0134198 | A1 | 6/2005 | Crandall et al. |
| 2005/0207196 | A1 | 9/2005 | Holmes et al. |

(Continued)

FOREIGN PATENT DOCUMENTS

WO    2004-057924 A1    7/2004

OTHER PUBLICATIONS

International Search Report, completed Sep. 16, 2010, pp. 1-3, Korean Intellectual Property Office, Daejeon, Republic of Korea.

(Continued)

*Primary Examiner* — David Porta
*Assistant Examiner* — Mindy Vu
(74) *Attorney, Agent, or Firm* — Andrew Martin

(57) ABSTRACT

A high voltage supply circuit to drive a light source in an optical sensor system. The high voltage supply provides a high voltage output to the light source during the start of an on time for the light source to decrease current rise time through the light source. After the start of the light source on time, the high voltage output is disconnected from the circuit and a current source provides current output to the light source to drive the light source during the remainder of the light source on time.

18 Claims, 4 Drawing Sheets

U.S. PATENT DOCUMENTS

| | | |
|---|---|---|
| 2005/0243022 A1 | 11/2005 | Negru |
| 2006/0038803 A1 | 2/2006 | Miller et al. |
| 2007/0024215 A1* | 2/2007 | Garbowicz et al. ........... 315/360 |
| 2007/0057936 A1 | 3/2007 | Lee et al. |
| 2008/0093997 A1 | 4/2008 | Chen et al. |
| 2008/0174929 A1 | 7/2008 | Shen et al. |
| 2008/0191642 A1 | 8/2008 | Slot et al. |
| 2008/0304043 A1 | 12/2008 | Benz et al. |
| 2009/0058323 A1 | 3/2009 | Yang |
| 2009/0079363 A1 | 3/2009 | Ghoman et al. |
| 2009/0267534 A1 | 10/2009 | Godbole et al. |
| 2010/0164405 A1 | 7/2010 | Tobey et al. |

OTHER PUBLICATIONS

Written Opinion of the International Searching Authority, completed Sep. 16, 2010, pp. 1-4, Korean Intellectual Property Office, Daejeon, Republic of Korea.

* cited by examiner

HIGH VOLTAGE SUPPLY TO INCREASE RISE TIME OF CURRENT THROUGH LIGHT SOURCE IN AN OPTICAL SENSOR SYSTEM

CROSS-REFERENCE TO RELATED APPLICATIONS

This application claims priority from the following commonly owned U.S. Provisional Patent Applications: Ser. No. 61/165,171, Ser. No. 61/165,181, Ser. No. 61/165,388, and Ser. No. 61/165,159, all of which were filed on Mar. 31, 2009.

This application is related to the following commonly-owned applications: U.S. Utility patent application Ser. No. 12/652,083, entitled "CURRENT SOURCE TO DRIVE A LIGHT SOURCE IN AN OPTICAL SENSOR SYSTEM"; U.S. Utility patent application Ser. No. 12/652,087, entitled "DUAL VOLTAGE AND CURRENT CONTROL FEEDBACK LOOP FOR AN OPTICAL SENSOR SYSTEM"; and U.S. Utility patent application Ser. No. 12/652,087, entitled "OPTICAL SENSOR SYSTEM INCLUDING SERIES CONNECTED LIGHT EMITTING DIODES"; all filed on Jan. 5, 2010, and all of which are hereby incorporated by reference.

TECHNICAL FIELD

The present application relates to the sensors and, more particularly, to a high voltage supply for increasing current through a light source in an optical sensor system.

BACKGROUND

Optical sensor systems may be used to locate and/or image an object by detecting light reflected from the object. Such systems may include a light source that transmits light toward an object and a detector for detecting portions of the transmitted light reflected by the object. A characteristic of the reflected light may be analyzed by the sensor system to determine the distance to an object and/or to generate an electronic image of the object.

In one example, such a system may include a light source, such as one or more light emitting diodes (LEDs), configured to transmit modulated infrared light (IR), i.e. IR light that is rapidly turned on and off. The detector may receive the reflected light and calculate the phase shift imparted by reflection of the light back to the senor. The time of flight of the received light may be calculated from the phase shift and distance to various points in the sensor field of view may be calculated by multiplying the time of flight and the velocity of the signal in the transmission medium. By providing an array of receiving pixels in the detector, the distance signals associated with light received at each pixel may be mapped to generate a three-dimensional electronic image of the field of view.

The manner of modulation of the light source in such systems is a factor in system performance. To achieve useful and accurate imaging, it is desirable to modulate the light source at a high frequency, e.g. 40 MHz. In addition, it is desirable in such systems to modulate the light source with high efficiency and reliability, while maintaining reasonable cost of manufacture and a relatively small package size.

SUMMARY

In an embodiment, there is provided a light source circuit for an optical sensor system. The light source circuit includes: a power supply to provide a regulated direct current (DC) voltage output; a light source; a current source coupled to the power supply and the light source to receive the regulated DC voltage output and to provide a current output; a first switch, the first switch being configured to allow the current output to the light source from the current source when the first switch is closed and to prevent the current output to the light source when the first switch is open; a high voltage supply circuit coupled to the light source to provide a high voltage output; and a second switch, the second switch being configured to connect the high voltage output to the light source from the high voltage supply when the second switch is closed and to disconnect the high voltage output from the light source when the second switch is open.

In a related embodiment, the circuit may further include a drive circuit to open and close the second switch, the drive circuit being configured to close the second switch at the start of an on time for the light source to connect the high voltage output to the light source and to open the second switch during a remainder of the on time of the light source to allow the current source to provide the current output to the light source. In another related embodiment, the circuit may further include a drive circuit to open and close the first and second switches at a predetermined frequency. In a further related embodiment, the predetermined frequency may be about 40 MHz.

In yet another related embodiment, the circuit may further include a diode coupled between the current source and the light source, the diode being configured to conduct to provide the current output to the light source only when the first switch is closed and the second switch is open. In still another related embodiment, the current source may include: an inductor connected in series with a resistor; and a diode coupled in parallel with the inductor and resistor; and wherein the current source is configured to provided the current output through the inductor to the light source when the first switch is closed and divert current through the inductor to the diode when the first switch is open. In a further related embodiment, the current source may include a current monitor coupled to the resistor and configured to provide the current feedback.

In still yet another related embodiment, the light source may include a plurality of series connected light emitting diodes.

In another embodiment, there is provided an optical sensor system. The optical sensor system includes: a controller; a light source circuit coupled to the controller to drive a light source in response to control signals from the controller, the light source circuit includes: a power supply to provide a regulated direct current (DC) voltage output; a current source coupled to the power supply and the light source to receive the regulated DC voltage output and to provide a current output; a first switch, the first switch being configured to allow the current output to the light source from the current source when the first switch is closed and to prevent the current output to the light source when the first switch is open; a high voltage supply circuit coupled to the light source to provide a high voltage output; and a second switch, the second switch being configured to connect the high voltage output to the light source from the high voltage supply when the second switch is closed and to disconnect the high voltage output from the light source when the second switch is open; transmission optics to direct light from the light source toward an object; receiver optics to receive light reflected from the object; and detector circuits to convert the reflected light to one or more electrical signals; wherein the controller is configured to provide a data signal output representative of a distance to at least one point on the object in response to the one or more electrical signals.

In a related embodiment, the optical sensor system may further include a drive circuit to open and close the second switch, the drive circuit being configured to close the second switch at the start of an on time for the light source to connect the high voltage output to the light source and to open the second switch during a remainder of the on time of the light source to allow the current source to provide the current output to the light source. In a further related embodiment, the optical sensor system may further include a diode coupled between the current source and the light source, the diode being configured to conduct to provide the current output to the light source only when the first switch is closed and the second switch is open.

In another related embodiment, the optical sensor system may further include a drive circuit to open and close the first and second switches at a predetermined frequency. In a further related embodiment, the predetermined frequency may be about 40 MHz. In still another related embodiment, the current source may include: an inductor connected in series with a resistor; and a diode coupled in parallel with the inductor and resistor; and wherein the current source is configured to provided the current output through the inductor to the light source when the first switch is closed and divert current through the inductor to the diode when the first switch is open. In a further related embodiment, the current source may include a current monitor coupled to the resistor and configured to provide the current feedback.

In yet another related embodiment, the light source may include a plurality of series connected light emitting diodes.

In yet another embodiment, there is provided a method of providing current to a light source in an optical sensor system. The method includes: connecting an initial voltage across the light source from a high voltage supply circuit during a start of an on time for the light source; disconnecting the initial voltage from the light source before the end of the on time for the light source; and providing current through a current source to the light source when the initial voltage is disconnected and for a remainder of the on time for the light source. In a related embodiment, connecting may include connecting an initial voltage across a plurality of series connected light emitting diodes from a high voltage supply circuit during a start of an on time for the plurality of series connected light emitting diodes; and disconnecting may include: disconnecting the initial voltage from the plurality of series connected light emitting diodes before the end of the on time for the plurality of series connected light emitting diodes; and providing may include: providing current through a current source to the plurality of series connected light emitting diodes when the initial voltage is disconnected and for a remainder of the on time for the plurality of series connected light emitting diodes.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
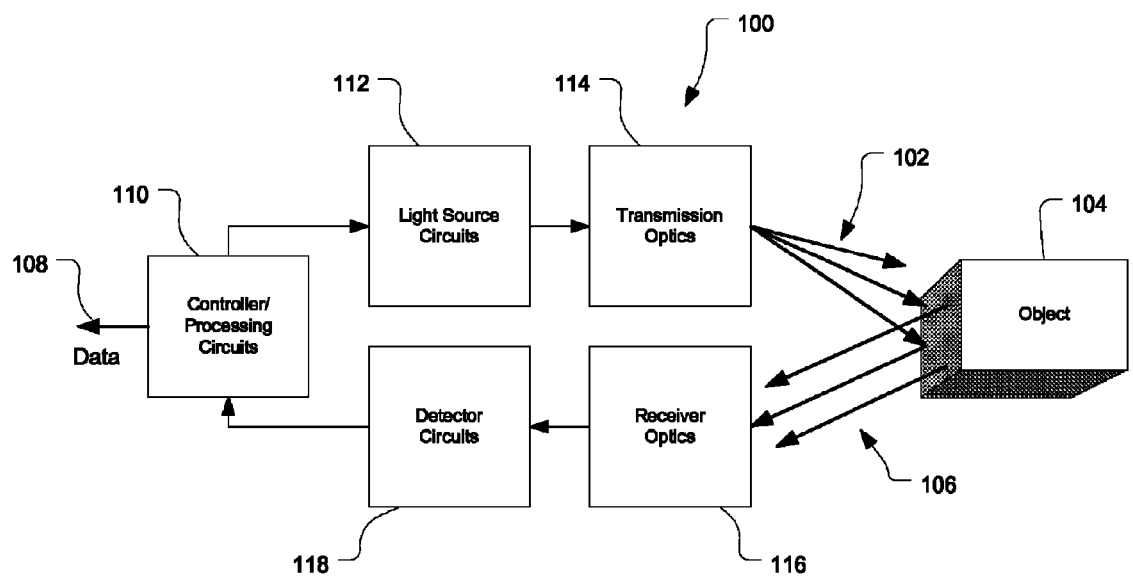
FIG. 1 is a block diagram of an optical sensor system according to embodiments disclosed herein.

FIG. 1 is a simplified block diagram of an optical sensor system 100 according to embodiments disclosed herein. In general, the optical sensor system 100 emits light 102, e.g. infrared (IR) light, that is reflected by an object 104, and receives the reflected light 106 to identify the distance to the object 104 and/or to map an image of the object 104. In some embodiments, for example, the system may be implemented as a collision avoidance sensor, e.g. a back-up sensor, for an automotive vehicle. In a back-up sensor application, for example, the system provides a data output 108 indicating distance from the rear of the vehicle to an object 104 for assisting a driver of the vehicle in avoiding inadvertent contact with the object 104 when moving in reverse. Although systems and methods consistent with the present disclosure may be described in connection with a particular application, those of ordinary skill in the art will recognize that a wide variety of applications are possible. For example, systems and methods consistent with the present disclosure may be implemented in optical sensors for range finding applications, or any application involving identification and/or imaging of a target object.

Those of ordinary skilled in the art will recognize that the optical sensor system 100 has been depicted in highly simplified form for ease of explanation. The optical sensor system 100 shown in FIG. 1 includes controller/processing circuits 110, light source circuits 112, transmission optics 114, receiver optics 116 and detector circuits 118. The controller/processing circuits 110 may be known circuits for controlling modulation of a light source of the light source circuits and for processing received data to generate an output data stream representative of the distance from the sensor to the object and/or an electronic image of the object. Controller/processing circuits 110 may, for example, be any of the depth sensor controller/processing circuits commercially available from Canesta, Inc. of Sunnyvale, Calif.

The light source circuits 112 may include known circuitry for driving the light source in response to control outputs from the controller/processing circuits 110, and may include circuitry consistent with the present disclosure. The transmission optics 114 may include known optical components for directing light output from the light source to provide a system field of view encompassing the object(s) of interest. The receiver optics 116 may include known optical components for receiving light reflected from the object of interest and directing the received light to the detector circuits 118. The detector circuits 118 may include known light detectors, e.g. arranged in an array of pixels, for converting the received light into electrical signals provided to the control/processing circuits 110. The detector circuits 118 may, for example, be any of the detector circuits commercially available from Canesta, Inc. of Sunnyvale, Calif. The control processing circuits 110 may calculate distance to various points on the object and within the system field of view, e.g. using phase shift in the received light to calculate time of flight and distance, to provide the data output indicating distance to the object and/or mapping the object to provide a three-dimensional image thereof.

Figure 2:
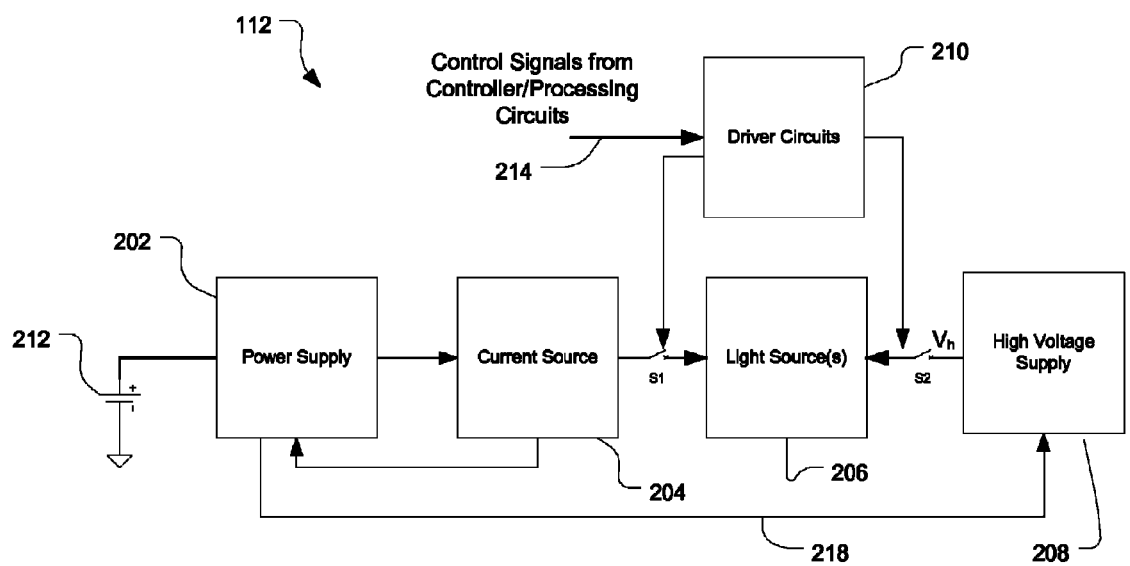
FIG. 2 is a block diagram of optical sensor system light source circuits according to embodiments disclosed herein.

FIG. 2 is a simplified block diagram of the light source circuits 112 according to embodiments described herein. The light source circuits 112 include a power supply 202, a current source 204 coupled to the output of the power supply 202, one or more light sources 206 coupled to the current source 204, a high voltage supply circuit 208 coupled to the current source 204, and driver circuits 210 for controlling switches S1 and S2 to turn the one or more light sources 206 off and on at a predetermined frequency, i.e. modulate the plurality of series connected LEDs 206. Connecting the plurality of series connected LEDs 206 in series according to embodiments described herein avoids phase differences between LED outputs and provides cost efficiency. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. The driver circuits 210 may take one of any known configuration or configuration described herein.

The power supply 202 may take any known configuration for receiving an input voltage from an input voltage source 212 and providing a regulated direct current (DC) voltage output. The input voltage source 212 may be, as is shown in FIG. 2, a DC source, e.g. a vehicle battery, and the power supply 202 may be, as is shown in FIG. 2, a known DC-DC converter for converting the DC source voltage to a regulated DC voltage at the output of the power supply 202. Known DC-DC converters include, for example, buck converters, boost converters, single ended primary inductor converter (SEPIC), etc. In some embodiments, a SEPIC converter may be used to allow a regulated DC output voltage that is greater than, less than, or equal to the input voltage. SEPIC converter and SEPIC converter controller configurations are well-known to those of ordinary skill in the art. One SEPIC converter controller useful in connection a system consistent with the present disclosure is commercially available from Linear Technology Corporation, as model number LTC1871®. Though FIG. 2 shows a DC source voltage, those of ordinary skill in the art will recognize that an alternating current (AC) input may alternatively be used and the power supply 202 may then include a known AC-DC converter for providing a regulated DC output voltage.

The current source 204 may provide a constant current to the one or more light sources 206 to energize the light sources when the switch S1 is closed by the driver circuits 210. The switch S1 is illustrated in diagrammatic form for ease of explanation, but may take any of a variety of configurations known to those of ordinary skill in the art. For example, the switch S1 may be a transistor configuration that conducts current under the control of the driver circuit output.

The driver circuits 210 may be configured to open and close the switch S1 at a predetermined frequency under the control of control signals 214 from the controller/processing circuits 110. In some embodiments, for example, the driver circuits 210 may open and close the switch S1 at a frequency of about 40 MHz. The current source 204 may thus provide a driving current to the one or more light sources 206 at the predetermined frequency for modulating the one or more light sources 206, i.e. turning the one or more light sources 206 on and off.

The high voltage supply circuit 208 may be coupled to the light source through the switch S2. The switch S2 may be closed by the driver circuits 210 under the control of control signals from the controller/processing circuits 110 during the start of the "on" time for the one or more light sources 206. A high voltage, i.e. higher than the output voltage of the power supply 202, may be coupled from the power supply 202 to the high voltage supply circuit 208, e.g. by path 218, and the high voltage supply circuit 208 may provide a high voltage output $V_h$ across the one or more light sources 206. In some embodiments, for example, the high voltage output $V_h$ may be about 18V, whereas the regulated DC output of the power supply 202 may be about 10V.

The high voltage supply circuit 208 may thus increase the voltage across the one or more light sources 206 to a higher voltage than can be established by the current source 204 to overcome the parasitic inductance in the one or more light sources 206 and decrease the rise time of the current through the one or more light sources 106. After the start of the "on" time for the one or more light sources 106 the switch S2 may open to disconnect the high voltage supply circuit 208 from the one or more light sources 106, and the switch S1 may be closed to allow the current source 204 to drive the one or more light sources 106 through the rest of the "on" time. The switch S2 is illustrated in diagrammatic form for ease of explanation, but may take any of a variety of configurations known to those of ordinary skill in the art. For example, the switch S2 may be a transistor configuration that conducts current under the control of the output of the driver circuits 210.

Figure 3:
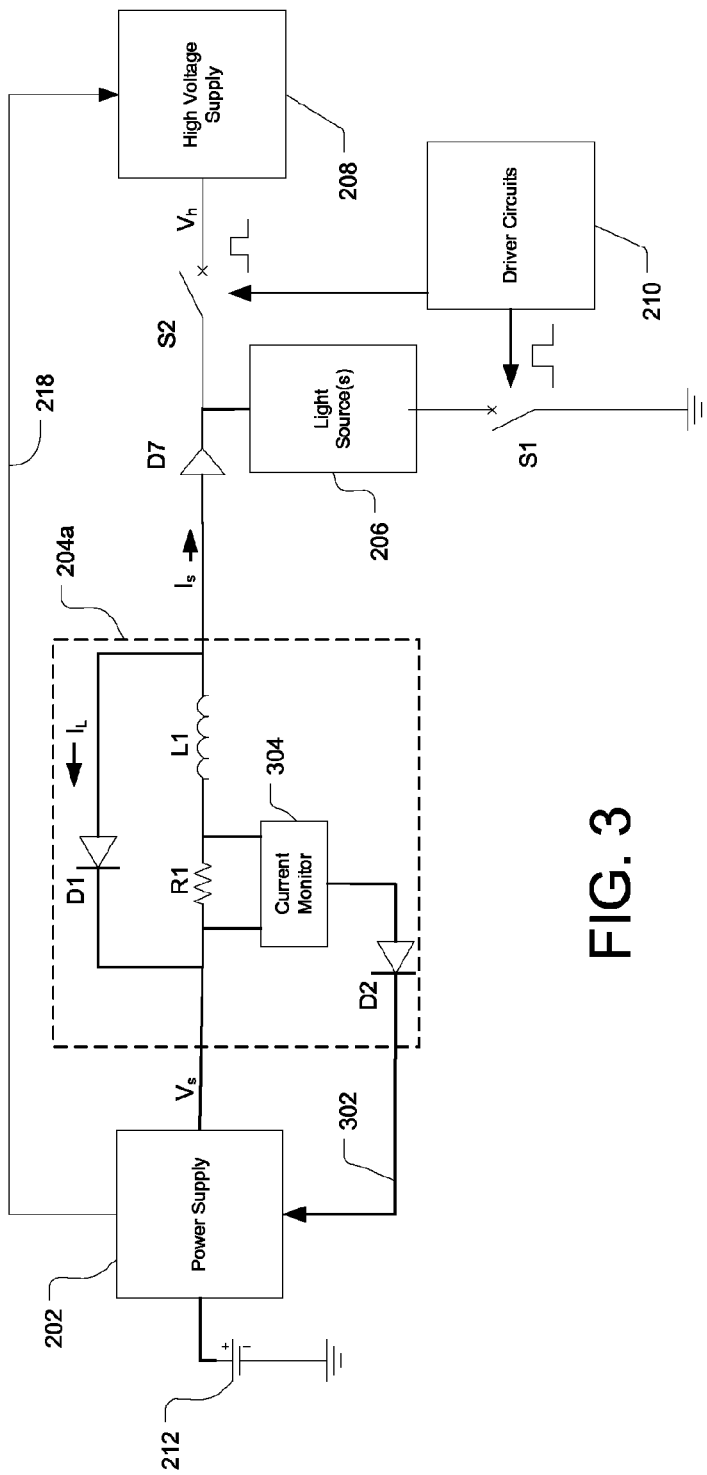
FIG. 3 is a block diagram of optical sensor system light source circuits including a high voltage supply according to embodiments disclosed herein.

FIG. 3 illustrates a light source circuit including a high voltage supply circuit 208. In FIG. 3, a current source 204a includes a resistor R1 in series with an inductor L1, and a diode D1 coupled in parallel across the series combination of the resistor R1 and the inductor L1. A feedback path 302 to the power supply 202 is provided by a current monitor 304 and a diode D2.

As shown, the regulated DC output $V_s$ of the power supply 202 may be coupled to the input of the current source 204a at the resistor R1. The driver circuits 210 may open and close the switch S1 at a high frequency, e.g. 40 MHz. When the switch S1 is closed, a current $I_s$ flows through the series combination of the resistor R1 and the inductor L1, and to the one or more light sources 206 to energize the light source. The inductor L1 thus establishes a constant current source and limits the current $I_s$ through the one or more light sources 206 when the switch S1 is closed. When the switch S1 is open, however, no current flows through the one or more light sources 206, and the current $I_L$ through the inductor L1 is diverted through the diode D1 to maintain current through the inductor L1.

As shown, the current monitor 304 may be coupled across the resistor R1 for sensing the voltage drop across resistor R1. The current monitor 304 may take any configuration known to those of ordinary skill in the art. In some embodiments, for example, the current monitor 304 may be configured using a current shunt monitor available from Texas Instruments® under model number INA138. The current monitor 304 may provide a feedback output to the power supply 202, e.g. through the diode D2.

In response to the feedback from the current monitor 304 and during the time when the switch S1 is closed, the power supply 202 may be configured to adjust the supply voltage $V_s$ to a voltage that will allow the inductor L1 to recharge. In some embodiments, the feedback path 302 maybe coupled to a voltage feedback path of the power supply 202 to provide a constant current control loop that takes control away from the voltage control loop during the time when the switch S1 is closed, i.e. the "on" time for the one or more light sources 206. A variety of configurations for providing an adjustable supply voltage in response to the current monitor feedback are well-known to those of ordinary skill in the art. In some embodiments, for example, the power supply 202 may be configured as a known converter, e.g. a SEPIC converter, and a known converter controller, e.g. a SEPIC controller configured to control the converter output in response to the current monitor feedback. A constant current may thus be established through the inductor L1 when the switch S1 is closed, i.e. when the one or more light sources 206 is/are "on" and emitting light.

Again, the high voltage supply circuit 208 is coupled to the one or more light sources 206 through the switch S2. The switch S2 may be closed by the driver circuits 210 under the control of control signals from the controller/processing circuits 118 during the start of the "on" time for the one or more light sources 206. When the voltage output of the high voltage supply circuit 208 is coupled to the one or more light sources 206, i.e. the switch S2 is closed, a diode D7 blocks the high voltage output of the high voltage supply circuit 208 from the current source 204a. After the start of the "on" time for the one or more light sources 206, the switch S2 may open to disconnect the high voltage supply circuit 208 from the one or more light sources 206. The diode D7 may then conduct and the current source 204a may drive the one or more light sources 206 through the rest of the "on" time.

Figure 3A:
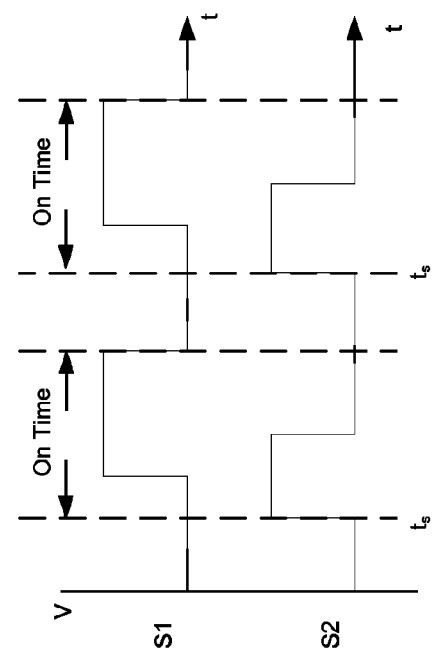
FIG. 3A is a timing diagram for closing switches S1 and S2 according to embodiments disclosed herein.

FIG. 3A is a timing diagram illustrating the timing of the signal from the driving circuits for closing the switches S1 and S2. As shown, in some embodiments, the switch S2 may be closed at the start $t_s$ of the "on" time for the light source(s) to initially provide a high voltage across the light source(s) to overcome any parasitic inductance in the light source(s) and thereby decrease the rise time of the current through the light source(s). The switch S1 may then close, but the high voltage output $V_h$ of the high voltage supply may prevent the current source from sourcing current to the light source(s) while the switch S2 is still closed. The switch S2 may then open allowing the diode D7 to conduct and the current source to drive the light source(s) during the remainder of the "on" time.

Figure 4:
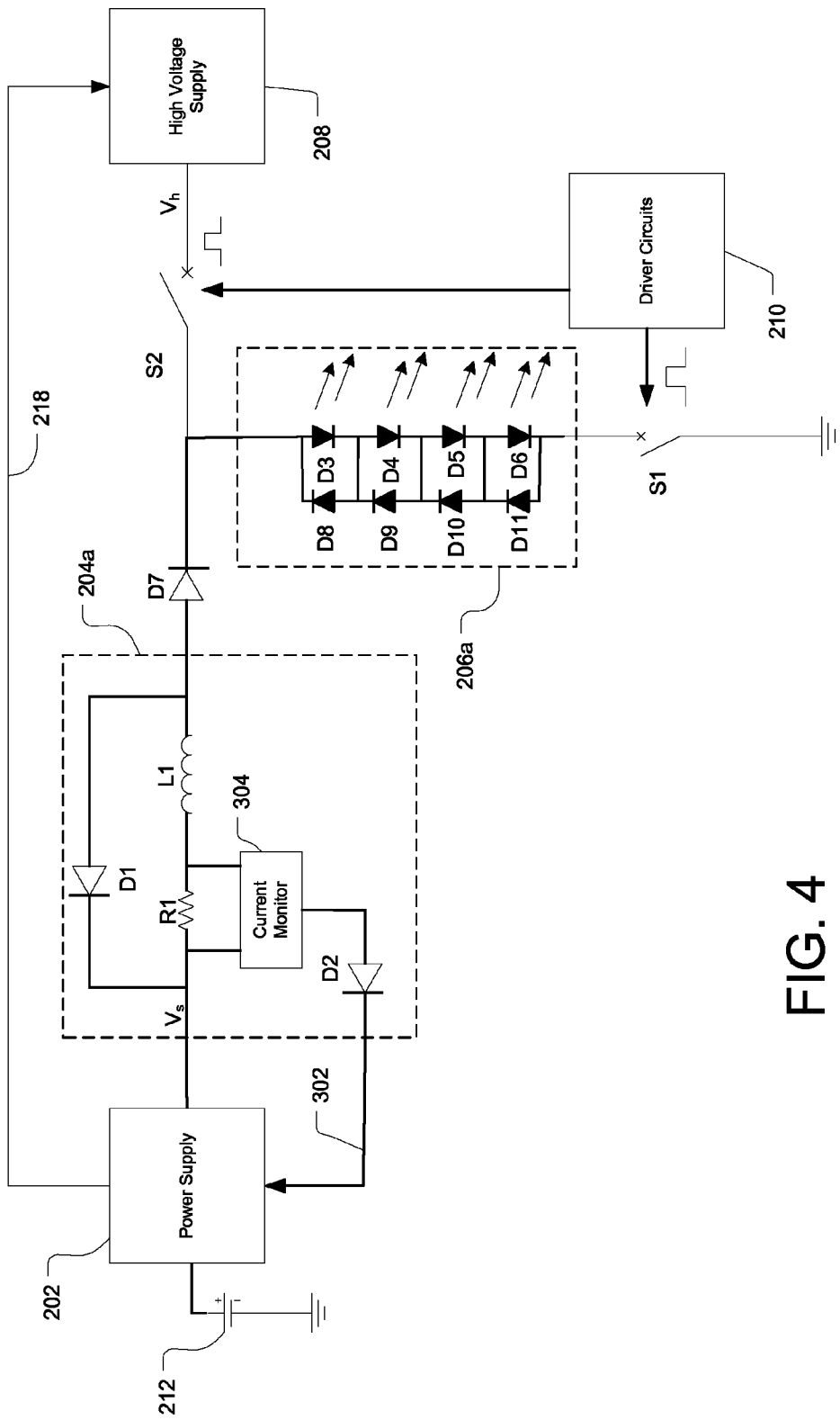
FIG. 4 is a block diagram of optical sensor system light source circuits including a high voltage supply to drive a light source including a plurality of series connected LEDs according to embodiments disclosed herein.

As shown in FIG. 4, a high voltage supply circuit 208 may be implemented in a system wherein the light source 206a includes a plurality of infrared LEDs D3, D4, D5, and D6 connected in series. Diodes D8, D9, D10, and D11 are coupled across the plurality of infrared LEDs D3, D4, D5, and D6, respectively, to take up any back voltage across the series connected plurality of infrared LEDs D3, D4, D5, and D6. Although the plurality of infrared LEDs as shown in FIG. 4 includes four series connected LEDs D3, D4, D5, and D6, it is to be understood that any number of LEDs may be connected in series.

In FIG. 4, driving current for the plurality of infrared LEDs D3, D4, D5, and D6 is initially provided by the high voltage supply circuit 208, e.g., by closing the switch S2 as described above. Series connected LEDs may exhibit significant parasitic inductance that limits rise time of the current source current therethrough. The high voltage output of the high voltage supply circuit 208 overcomes the parasitic inductance of the plurality of infrared LEDs D3, D4, D5, and D6 to allow a faster rise time of the current through the plurality of infrared LEDs D3, D4, D5, and D6 than could be achieved by current from the current source 204a. When the switch S2 opens and the switch S1 is closed, the diode D7 may conduct to allow the current source 204a to drive the plurality of infrared LEDs D3, D4, D5, and D6 in the remainder of the LED "on" time. This configuration allows a relatively fast rise time of the current through the series connected plurality of infrared LEDs D3, D4, D5, and D6 and a constant current from the current source 204a through the series connected plurality of infrared LEDs D3, D4, D5, and D6 to allow switching/modulation of the LED output at relatively high frequency, e.g. 40 MHz. Connecting the LEDs in series avoids phase differences between LED outputs and provides cost efficiency.

Figure 5:
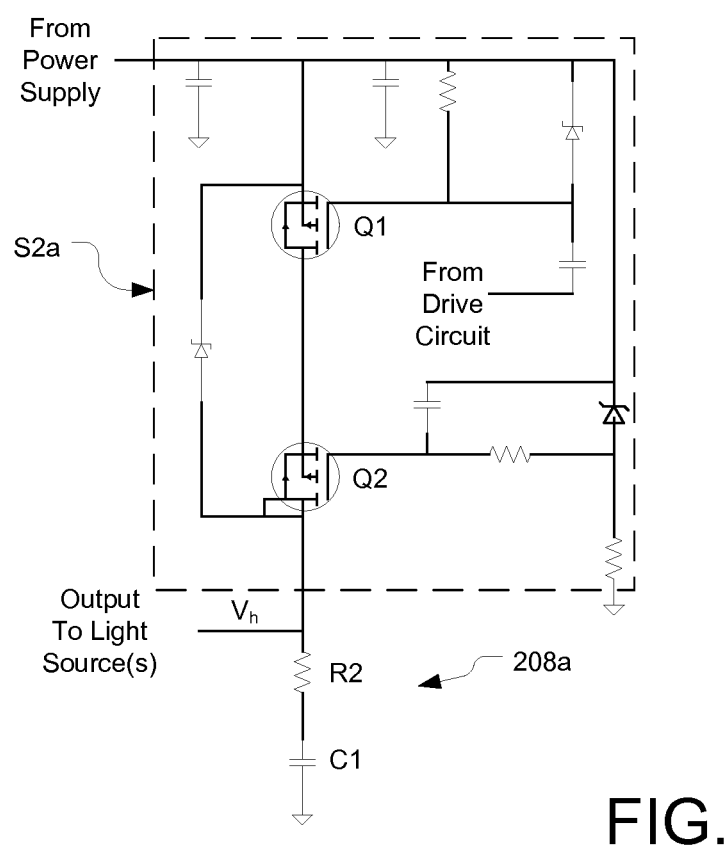
FIG. 5 is a circuit diagram of a high voltage supply according to embodiments disclosed herein.

Those of ordinary skill in the art will recognize that a high voltage supply may be provided in a variety of configurations. FIG. 5 is a circuit diagram of a high voltage supply circuit 208a and a switch S2a. In FIG. 5, the switch S2a is implemented using a first metal-oxide semiconductor field-effect transistor (MOSFET) Q1 and a second metal-oxide semiconductor field-effect transistor (MOSFET) Q2 configured and biased in cascode configuration. The first MOSFET Q1 is in a common source configuration and the second MOSFET Q2 is in a common gate configuration.

A high voltage input is coupled to the source of the first MOSFET Q1 from a node in the power supply that has a higher voltage than the output voltage of the power supply. In some embodiments, for example, the drain of the power MOSFET in a SEPIC converter implementing a model number LTC1871® SEPIC converter controller available from Linear Technology Corporation may be coupled to the source of the first MOSFET Q1. The gate of the first MOSFET Q1 may be coupled to the drive circuit. The drive circuit may provide a square wave signal to the gate of the first MOSFET Q1 for causing the first MOSFET Q1 and the second MOSFET Q2 to conduct periodically, i.e. to open and close the switch S2a as described above. When the first MOSFET Q1 and the second MOSFET Q2 conduct, the high voltage across a resistor R2 and a capacitor C1 is provided across the light source.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A light source circuit for an optical sensor system, the circuit include:
    a power supply to provide a regulated direct current (DC) voltage output;
    a light source;
    a current source coupled to the power supply and the light source to receive the regulated DC voltage output and to provide a current output;
    a first switch, the first switch being configured to allow the current output to the light source from the current source when the first switch is closed and to prevent the current output to the light source when the first switch is open;

a high voltage supply circuit coupled to the light source to provide a high voltage output; and a second switch, the second switch being configured to connect the high voltage output to the light source from the high voltage supply when the second switch is closed and to disconnect the high voltage output from the light source when the second switch is open.

2. The light source circuit according to claim 1, the circuit further include a drive circuit to open and close the second switch, the drive circuit being configured to close the second switch at the start of an on time for the light source to connect the high voltage output to the light source and to open the second switch during a remainder of the on time of the light source to allow the current source to provide the current output to the light source.

3. The light source circuit according to claim 1, the circuit further include a drive circuit to open and close the first and second switches at a predetermined frequency.

4. The light source circuit according to claim 3, wherein the predetermined frequency is about 40MHz.

5. The light source circuit according to claim 1, the circuit further include a diode coupled between the current source and the light source, the diode being configured to conduct to provide the current output to the light source only when the first switch is closed and the second switch is open.

6. The light source circuit according to claim 1, wherein the current source include:

an inductor connected in series with a resistor; and a diode coupled in parallel with the inductor and resistor;

and wherein the current source is configured to provided the current output through the inductor to the light source when the first switch is closed and divert current through the inductor to the diode when the first switch is open.

7. The light source circuit according to claim 6, wherein the current source include a current monitor coupled to the resistor and configured to provide the current feedback.

8. The light source circuit according to claim 1, wherein the light source include a plurality of series connected light emitting diodes.

9. An optical sensor system include:

a controller;

a light source circuit coupled to the controller to drive a light source in response to control signals from the controller, the light source circuit include:

a power supply to provide a regulated direct current (DC) voltage output;

a current source coupled to the power supply and the light source to receive the regulated DC voltage output and to provide a current output;

a first switch, the first switch being configured to allow the current output to the light source from the current source when the first switch is closed and to prevent the current output to the light source when the first switch is open;

a high voltage supply circuit coupled to the light source to provide a high voltage output; and a second switch, the second switch being configured to connect the high voltage output to the light source from the high voltage supply when the second switch is closed and to disconnect the high voltage output from the light source when the second switch is open;

transmission optics to direct light from the light source toward an object;

receiver optics to receive light reflected from the object; and detector circuits to convert the reflected light to one or more electrical signals;

wherein the controller is configured to provide a data signal output representative of a distance to at least one point on the object in response to the one or more electrical signals.

10. The optical sensor system according to claim 9, further include a drive circuit to open and close the second switch, the drive circuit being configured to close the second switch at the start of an on time for the light source to connect the high voltage output to the light source and to open the second switch during a remainder of the on time of the light source to allow the current source to provide the current output to the light source.

11. The optical sensor system according to claim 10, further include a diode coupled between the current source and the light source, the diode being configured to conduct to provide the current output to the light source only when the first switch is closed and the second switch is open.

12. The optical sensor system according to claim 9, further include a drive circuit to open and close the first and second switches at a predetermined frequency.

13. The optical sensor system according to claim 12, wherein the predetermined frequency is about 40MHz.

14. The optical sensor system according to claim 9, wherein the current source include:

an inductor connected in series with a resistor; and a diode coupled in parallel with the inductor and resistor;

and wherein the current source is configured to provided the current output through the inductor to the light source when the first switch is closed and divert current through the inductor to the diode when the first switch is open.

15. The optical sensor system according to claim 14, wherein the current source include a current monitor coupled to the resistor and configured to provide the current feedback.

16. The optical sensor system according to claim 9, wherein the light source include a plurality of series connected light emitting diodes.

17. A method of providing current to a light source in an optical sensor system, the method include:

connecting an initial voltage across the light source from a high voltage supply circuit during a start of an on time for the light source;

disconnecting the initial voltage from the light source before the end of the on time for the light source; and providing current through a current source to the light source when the initial voltage is disconnected and for a remainder of the on time for the light source.

18. A method according to claim 17, wherein connecting include:

connecting an initial voltage across a plurality of series connected light emitting diodes from a high voltage supply circuit during a start of an on time for the plurality of series connected light emitting diodes;

and wherein disconnecting include:

disconnecting the initial voltage from the plurality of series connected light emitting diodes before the end of the on time for the plurality of series connected light emitting diodes;

and wherein providing include:

providing current through a current source to the plurality of series connected light emitting diodes when the initial voltage is disconnected and for a remainder of the on time for the plurality of series connected light emitting diodes.

\* \* \* \* \*